UNITED STATES PATENT OFFICE.

CHARLES BALTZ, OF CHICAGO, ILLINOIS, AND JOHN PRINDLE AND STEPHEN W. PRINDLE, OF SHARON, WISCONSIN.

IMPROVEMENT IN THE MANUFACTURE OF CHEESE.

Specification forming part of Letters Patent No. 192,963, dated July 10, 1877; application filed June 14, 1877.

*To all whom it may concern:*

Be it known that we, CHAS. BALTZ, of Chicago, Cook county, Illinois, and JNO. PRINDLE and S. W. PRINDLE, both of Sharon, in the county of Walworth and State of Wisconsin, have invented certain new and useful Improvements in Manufacture of Cheese; and we do hereby declare the following to be a full, clear, and exact description of the invention, such as will enable others skilled in the art to which it pertains to make and use it.

Our invention relates to the manufacture of cheese; and it consists in the method of treating the whey, that will be more fully described hereinafter, whereby we are enabled to make as good if not a better article than can be produced in any other manner, and at a less expense.

Our process is as follows: The whey is taken from the vat, put in a suitable evaporator, subjected to a slow heat, and the casein all skimmed off that may arise to the top before the whey boils. When the whey is clear stir well, increase the heat, and boil down to the consistency of thin sirup. Then take it from the evaporator, put it into a smaller copper kettle, subject it again to slow heat, and add fresh sweet milk, at the rate of one gallon to about one hundred pounds, to the mass. Keep constantly stirring to prevent it from burning, and skim again until quite clear. Let it boil down sufficiently to form in cakes when cold.

Having thus described our invention, we claim—

The process herein described of treating the whey, consisting of subjecting the whey to slow heat and boiling until reduced to the consistency of sirup, again subjecting it to slow heat, adding fresh sweet milk, and boiling down until it forms cakes when cold, substantially as described.

In testimony that we claim the foregoing we have hereunto set our hands this 1st day of June, 1877.

CHARLES BALTZ.
    JOHN PRINDLE.
    S. W. PRINDLE.

Witnesses:
 G. P. DUSTIN,
 HOWLAND FISH.
Witnesses to signature of Baltz:
 GEORGE W. PLUMMER,
 V. A. TURPIN.